(12) United States Patent
Heurman et al.

(10) Patent No.: US 10,455,841 B2
(45) Date of Patent: Oct. 29, 2019

(54) CLAMP FOR CLAMPING A CORD ON ACCOUNT OF TENSION IN THE CORD

(71) Applicant: Caps International B.V., Enschede (NL)

(72) Inventors: Erwin Herman Gerhardus Heurman, Enschede (NL); Kamiel Reinier Zale Geenen, Ravenstein (NL); Simon Alexander Verheul, Beek Ubbergen (NL); Andries Van Berkum, Nijmegen (NL); Pim Johan Hans Gijsbers, Nijmegen (NL)

(73) Assignee: Caps International B.V., Enschede (NL)

( * ) Notice: Subject to any disclaimer, the term of this patent is extended or adjusted under 35 U.S.C. 154(b) by 659 days.

(21) Appl. No.: 15/101,594

(22) PCT Filed: Dec. 3, 2014

(86) PCT No.: PCT/NL2014/050828
§ 371 (c)(1),
(2) Date: Jun. 3, 2016

(87) PCT Pub. No.: WO2015/084171
PCT Pub. Date: Jun. 11, 2015

(65) Prior Publication Data
US 2016/0374356 A1    Dec. 29, 2016

(30) Foreign Application Priority Data
Dec. 5, 2013  (NL) ...................................... 2011902

(51) Int. Cl.
*A22B 5/00*    (2006.01)
*F16G 11/10*   (2006.01)
*F16G 11/14*   (2006.01)

(52) U.S. Cl.
CPC .......... *A22B 5/0005* (2013.01); *F16G 11/105* (2013.01); *F16G 11/14* (2013.01); *A22B 2005/0011* (2013.01)

(58) Field of Classification Search
CPC ...................................................... A22B 5/005
See application file for complete search history.

(56) References Cited

U.S. PATENT DOCUMENTS 4,293,977 A * 10/1981 Volk ................... A22C 21/0038
452/174
4,646,394 A    3/1987 Krauss
(Continued)

FOREIGN PATENT DOCUMENTS

FR    2802598 A1    6/2001

OTHER PUBLICATIONS

"Werkboek Hygienecode Runderslachterij Deel 11 Slachthandelingen (procesgang)", Nov. 25, 1997, voorstel Jan. 7, 2009, pp. 1-13.

*Primary Examiner* — Richard T Price, Jr.
(74) *Attorney, Agent, or Firm* — The Webb Law Firm

(57) ABSTRACT

Clamp (1) for clamping a cord in tension, in which the clamp comprises a U-shaped elongate frame (2) with an elongate recess and an elongate clamping body (3) which is connected to the frame and extends in the recess of the frame, in which—a cord duct (11) is formed in the recess between the clamping body and a clamping surface (10) of the frame, the clamping body is configured to be carried along by a cord passed through the cord duct, in which the distance between the clamping body and the clamping surface decreases when the clamping body is moved, the clamping body has a widened part (7) at one end and in which a hinge (4) is provided between the legs (6a, 6b) of the frame and the (Continued)

widened part of the clamping body, the axis of rotation of which extends at right angles to the longitudinal direction of the frame.

20 Claims, 3 Drawing Sheets

(56) References Cited

U.S. PATENT DOCUMENTS

| | | | | |
|---|---|---|---|---|
| 4,739,538 A * | 4/1988 | Volk | ................... | A22C 21/0038 |
| | | | | 452/174 |
| 5,181,880 A * | 1/1993 | Volk | ................... | A22C 21/0038 |
| | | | | 452/174 |
| 5,292,277 A * | 3/1994 | Volk | ................... | A22C 21/0038 |
| | | | | 452/174 |
| 5,749,778 A * | 5/1998 | Volk | ................... | A22C 21/0038 |
| | | | | 452/174 |
| 6,190,249 B1 * | 2/2001 | Karubian | ................. | A22B 5/14 |
| | | | | 24/339 |
| 6,415,480 B1 | 7/2002 | Kane et al. | | |

* cited by examiner

CLAMP FOR CLAMPING A CORD ON ACCOUNT OF TENSION IN THE CORD

CROSS-REFERENCE TO RELATED APPLICATIONS

This application is the United States national phase of International Application No. PCT/NL2014/050828 filed Dec. 3, 2014, and claims priority to Dutch Patent Application No. 2011902 filed Dec. 5, 2013, the disclosures of which are hereby incorporated in their entirety by reference.

BACKGROUND OF THE INVENTION

Field of the Invention

The invention relates to a clamp for clamping a cord at a clamping location of the cord on account of a tension prevailing at a tension side of the clamping location in the cord.

Description of Related Art

Such clamps are generally known in the form of sheet clamps which are used in sailing and which are provided with two wheel segments, between which a sheet is guided which causes the wheel segments to rotate when it is being tightened until they reach a position in which the wheel segments clamp the sheet.

Furthermore, FR-B-2 802 598 shows a clamp for clamping a cord at a clamping location of the cord on account of a tension prevailing at a tension side of the clamping location in the cord, in which the clamp is provided with an elongate frame which is provided with an elongate recess and with an elongate clamping body which is rotatably connected at a first end to a first end of the frame and extends at least partly in the recess of the frame, in which a cord duct is formed in the recess between the second end of the clamping body and an opposite clamping surface of the frame, in which the second end of the clamping body is configured to be carried along by a cord passed through the cord duct in the direction towards the tension side of the cord, and in which the smallest distance between the clamping body and the clamping surface decreases when the clamping body is moved towards the tension side of the cord.

This known clamp has considerable dimensions, as is clear from the drawings and the description which indicates that the clamp may be made of wood.

It is an object of the invention to provide such a clamp which can be much smaller and less expensive and which is suitable for clamping thin cords.

SUMMARY OF THE INVENTION

This object is achieved by a clamp of the abovementioned kind, in which the frame is substantially in the shape of a U, in which the legs of the U are situated at its first end and the bridge at its second end, the clamping body is provided with a widened part at its first end, and in which a hinge is provided between each of the ends of the legs of the frame and the widened part of the clamping body, the axis of rotation of which extends at right angles to the longitudinal direction of the frame and at right angles to the axis of the cord duct.

Clamping the cord requires considerable force which has to be transmitted from the clamping body to the frame. With the prior-art clamp, these forces are passed through the hinge which is subjected to a pressure load due to the construction used. When reducing the construction in size, there is a risk that the pressure force causes the hinge to deflect laterally, resulting in failure of the hinge. After all, the dimensions of the hinge are small, as a result of which it has a low stiffness. By using the configuration according to the invention, both hinges are subjected to a tensile load. If a sufficiently strong type of material is chosen, failure of the hinges can easily be prevented, even when the dimensions of the clamp are small.

According to a first preferred embodiment, both hinges are formed by a thinning of material between both legs of the end of the frame and the widened part of the clamping body. This embodiment simplifies production and makes it possible to produce the clamp by means of injection-molding.

The principle of the clamp means that the clamping body has to be subjected to a force which forces the clamping body to the part of the cord which is under tension. To this end, this part of the cord has to be put under tension, for example by temporarily generating a tensile force in the other part of the cord which is transmitted to the former part of the cord and which is maintained by the action of the clamp when the tension in the other part of the cord is removed. This tension is transmitted by the friction between the cord and the clamping body or the clamping surface, respectively. In many cases, a loop is made on the tension side of the cord, such as around a packaging closure. The free end of that part of the cord where the tension prevails is then connected to the clamp. In order to increase the force to be exerted on the clamping body, it is possible to connect this free end to the clamping body, as a result of which both ends of the piece of cord where the tension prevails transmit this tension to the clamping body and the clamping action of the clamping body is increased. In order to facilitate attachment of the cord to the clamping body, a first embodiment then also proposes to provide the clamping body with an opening which extends substantially parallel to the cord duct. In this case, it is important to place the opening at a certain distance from the hinges, since a moment with respect to the hinge pin has to be generated.

As has already been explained above, the action of the clamp is based on the friction between the cord on the one hand and the clamping body or the clamping surface on the other hand. In order to increase the friction between the cord and the clamping surface, the clamping surface of the frame is preferably provided with a thickening which extends at right angles to the direction of the duct. After all, this increases the contact surface between the cord and the clamping surface, while additionally forcing the cord into a curve, thus increasing the frictional forces further.

In order to avoid that the clamping body slips in an undesirable manner under extreme tension and deforms the clamp, it is preferable for the second end of the clamping body to touch the thickening in a limit position of the clamping body. When the clamping body cannot rotate any further, there is not only friction between the cord and the clamping surface or between the cord and the thickening, but friction is also created between the cord and the clamping body, resulting in additional fixation.

At its first end, the clamping body is connected to the frame. The clamping body is separated from the frame on either side and at its second end by a gap or the cord duct, respectively. A cord running in the cord duct can then, in particular if it is relatively thin, move into one of the gaps on the sides of the clamping body. In order to prevent this, a preferred embodiment provides the measure of providing the frame with cord guides which are arranged in the recess and guide the cord towards the center of the cord duct. These cord guides may also extend below the recess.

In order to ensure that the cord guides are effective, it is preferred if the cord guides adjoin the thickening. In addition, this measure makes is easier to design the clamp so that it is easier to release it from an injection mold.

In order to prevent the situation where, with excessive tension in the cord, so many forces act on the clamping body that it bends and the clamping body exerts an insufficiently large clamping force on the cord, it is preferred if the frame is provided with at least one stop extending in the recess from one of the legs in order to limit the movement by the clamping body towards the tension side of the cord. This stop prevents the clamping body from bending, in particular, but not exclusively, if the stop is arranged approximately in the center of the recess in the frame.

In order to prevent the clamping body from warping, it is attractive if the frame is provided with two stops, each of which projects from one leg.

It is attractive, in particular if the clamp is produced in large numbers, to use an injection-molding technique for manufacturing. The cost price can be reduced further if the injection mold consists of as few parts as possible. The presence of the stops without further measures makes it impossible to use a two-part injection mold. However, if recesses is arranged in the clamping body in a position of the clamping body which deviates from the clamping position and situated in the projection of the stops, the clamp can also be released from a two-part injection mold.

In order to make the clamp sufficiently strong, it is preferred if an external thickening is provided on the bridge of the U-shaped frame. This thickening is then preferably situated opposite the thickening of the clamping surface in order to reduce the bending tension occurring there and the resulting deformation.

In a number of situations, it is attractive if the clamp is pressed down using a finger. In order to facilitate the pressing down, it is preferred if two pieces are placed between the external thickening and an upper edge of the bridge of the U-shaped part. This lowers the contact pressure on the skin of the user, thus increasing the comfort. Incidentally, the legs of the U-shaped frame are thickened at the top for the same reason.

Although it is not excluded that it can be made of other types of plastics, it is preferred if the clamp is made of POM (polyoxymethylene), since this is a strong, inexpensive and readily processable material.

The invention not only relates to one of the above-described type, but also relates to a combination of such a clamp, in which the clamp is configured to clamp the cord. This relates in particular to dimensioning of the clamp with regard to the thickness of the cord. Thus, the minimum thickness of the cord is preferably greater than the smallest dimension in the cord duct between the clamping body and the frame.

With such a combination, the cord is preferably passed through the cord duct and the free end of the cord is passed through the opening in the clamping body on the tension side and provided with a thickening, such as a knot, the largest size of which is greater than the smallest cross section of the opening.

The invention furthermore relates to a combination of a clamp of the abovementioned kind and an enveloping element having an opening, which enveloping element is provided with guide means which extend around the opening and through which the cord extends. This produces a device which can be used in particular for closing off the cut end of the rectum of a carcass of a slaughter animal in order to prevent the manure present in the rectum soiling the carcass. The enveloping element then extends around the end of the cut rectum and is fixed to the rectum by means of the cord and the clamp.

In this case, a method is used for fitting a combination of the abovementioned kind to the cut end of the rectum of the carcass of a slaughter animal, such as a cow, comprising the steps of placing a first hand in the enveloping element, fitting the enveloping element around the part of the rectum adjacent to the cut end with the first hand, with the enveloping element being turned inside out in the process, grasping the second end of the cord with the second hand, pulling the cord tight with the second hand, the first hand releasing the rectum and the second hand releasing the second end of the cord.

In order to facilitate pulling on the cord, a further embodiment proposes to provide the second end of the cord with a pulling eye, pulling hook or pulling loop.

When carrying out the method, the clamp is pressed down with at least one finger of the first hand, preferably during or after the cord has been pulled tight by the second hand.

BRIEF DESCRIPTION OF THE DRAWINGS

The invention will now be explained with reference to the drawings, in which.

DESCRIPTION OF THE INVENTION

Figure 1:
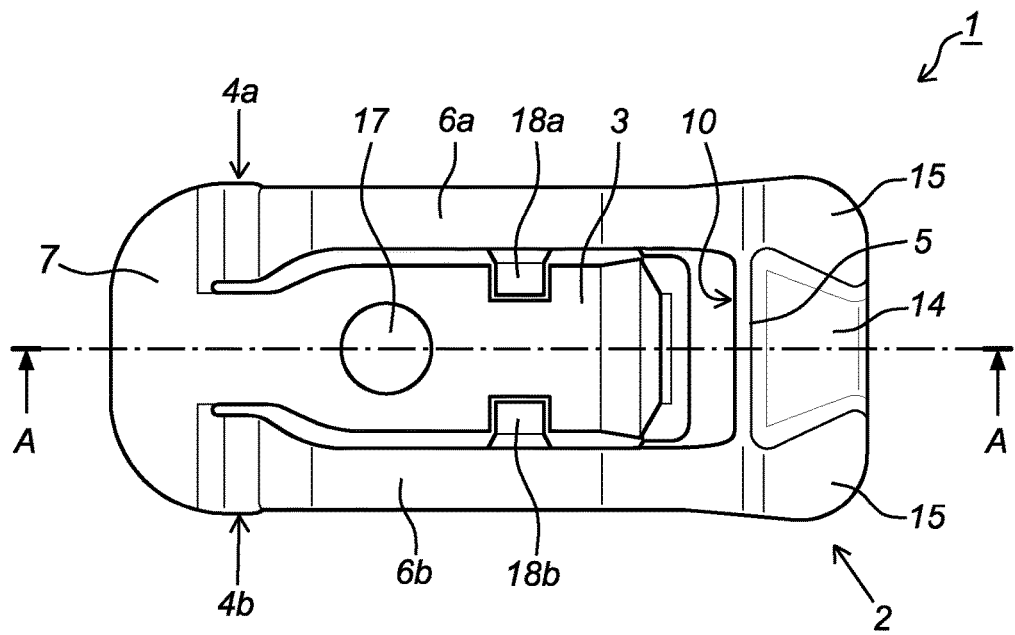
FIG. 1 shows a top view of a clamp according to the invention.
Figure 2:
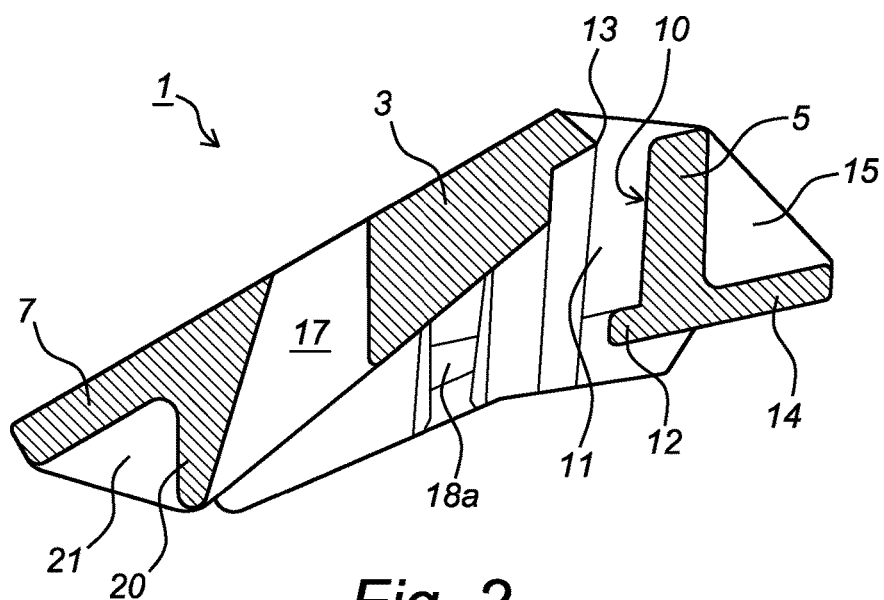
FIG. 2 shows a sectional view of the clamp illustrated in FIG. 1 according to line II-II in FIG. 1.
Figure 3:
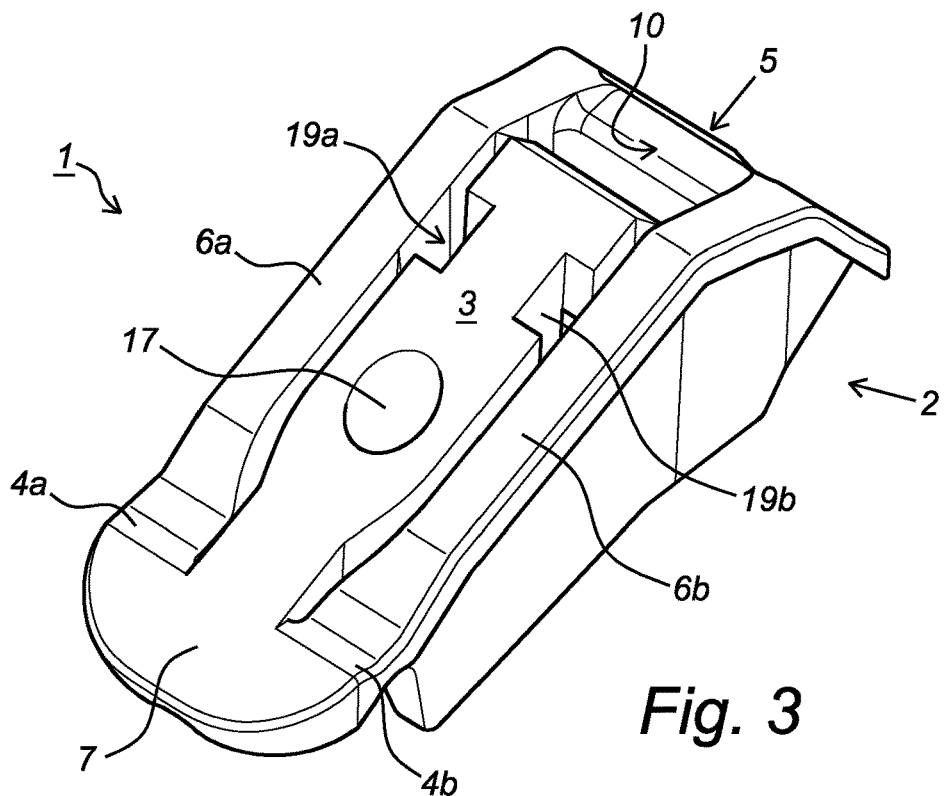
FIG. 3 shows a perspective view of the clamp illustrated in FIGS. 1 and 2.

The clamp according to the invention which is denoted overall by reference numeral 1 and which is illustrated in FIGS. 1, 2 and 3, comprises a frame 2 and a clamping body 3, which are connected to each other by two hinges 4a, 4b. The frame 2 is in the shape of a U and has a bridge 5 and two legs 6a, 6b. The clamping body 3 is provided with a widened part 7, with the hinges 4a, 4b being formed between the ends of the two legs 6a, 6b and the widened part 7 of the clamping body 3. The entirety of the clamp is made of plastic, preferably of POM, preferably by means of injection-molding. The hinges have a stiffness which is such that the clamping body 3 assumes a neutral position with respect to the frame 2 without external forces acting on it, as is illustrated in the figures.

Figure 4:
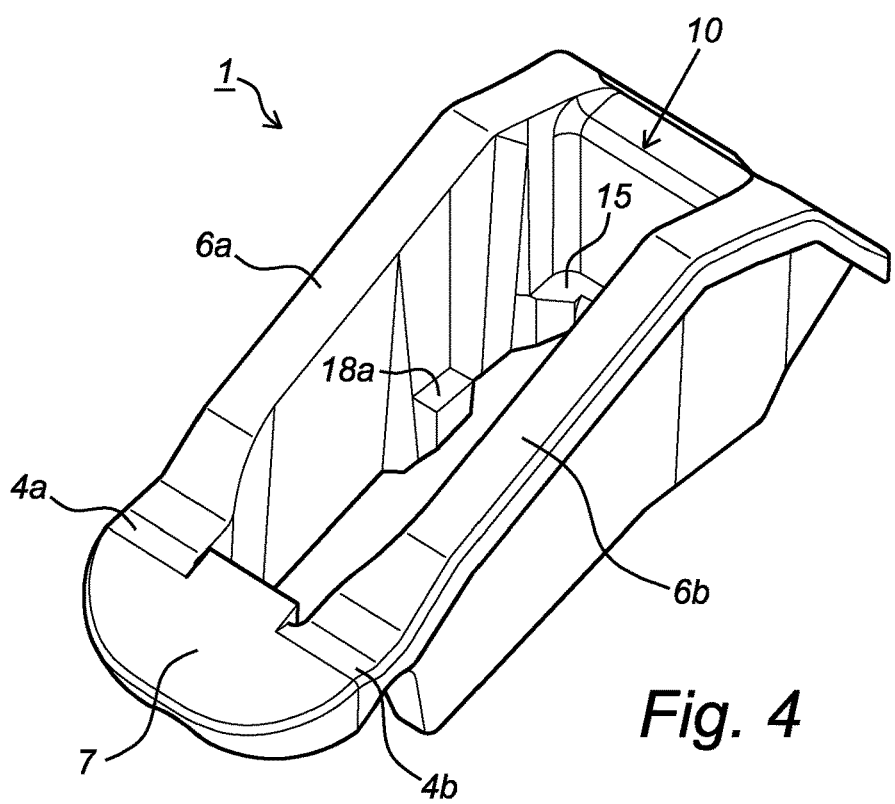
FIG. 4 shows a perspective view corresponding to FIG. 3, in which a part of the clamping body has been omitted.

As can be seen most clearly in FIG. 2, the bridge 5 of the frame 2 is provided with a clamping surface 10 on the inner side. A cord duct 11 is formed between the clamping surface and the clamping body 3, through which a cord which is to be clamped by the clamp extends. In the vicinity of the bottom side of the clamp, an internal thickening 12 is provided which has a shape such that, when the clamping body 3 is moved down, an edge 13 of the clamping body 3 touches the internal thickening 12 and stops the downward movement of the clamping body 3. On the outer side of the bridge 5 of the U-shaped part 2, an external thickening 14 is provided at the location of the internal thickening 12. Between both corners of the external thickening 14 and the top edge of the bridge 5, a triangular reinforcement part 15 is in each case formed. For guiding the cord towards the center of the cord duct 11, two cord guides 15 are formed next to the internal thickening 12 and the inner surface of both legs 6 of the frame 2 as can best be seen in FIG. 4, in which a part of the clamping body 3 has been omitted. Furthermore, two secondary cord guides 22 are provided on the bottom side of the frame 2 in the vicinity of the cord duct 11.

An opening 17 is provided approximately in the center of the clamping body 3. The internal side surfaces of the legs 6 are provided with stops 18a, 18b extending inwards which stop the downward movement of the clamping body 3 in case the clamping body 3 is pulled down so far that although it rests on the internal thickening 12, it bends in the center. As illustrated in FIG. 1, a recess 19a, 19b is in each case provided in the clamping body 3 at the location of the stops 18a, 18b. These recesses 19a, 19b are positioned in such a manner that they allow release of the clamp 1 from a two-part mold during injection-molding, but that they do not prevent the action of the stops 18a, 18b, since the stops 18a, 18b touch the clamping body 3 next to the recesses 19a, 19b due to the rotating movement of the clamping body 3 about the hinges 4a, 4b.

Finally, a thickening 20 is provided in the widened part 7 of the clamping body 3 in order to reinforce the widened part 7. A recess 21 is provided in the thickening in order to save on material and to accelerate cooling down.

Figure 5:
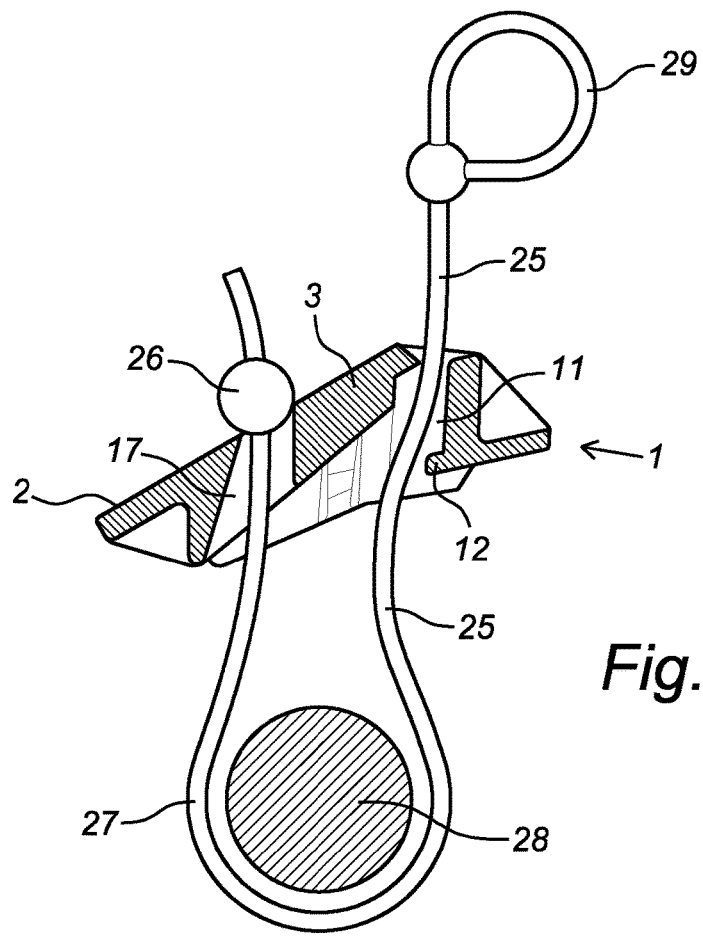
FIG. 5 shows a view corresponding to FIG. 2 of the clamping element with an associated cord.

The clamp 1 is used in combination with a cord 25, as is illustrated in FIG. 5. In this case, the cord 25 is provided with a knot 26 at a first end. The cord 25 is then passed through the opening 17 of the clamping body 3 of the clamp 1, is passed in a loop 27 around an element 28 to be closed off and passed through the cord duct 11. At its second end, the cord is provided with a pulling loop 29. Starting from the situation shown in FIG. 5, the user pulls on the pulling loop 29, as a result of which the loop 27 is pulled tight around the element 28 to be closed off until the clamp 1 itself is in contact with the element 28 to be closed off. When pulling is continued, the tension in the cord 25 increases and when the cord is released, it will move back over a small distance through the cord duct 11 to the element 28 to be closed off and in this case force the clamping body 3 as far as possible against the internal thickening 12. In this case, the cord 25 itself is clamped securely between the clamping surface 10 and the clamping body 3. Thus, the cord 25 is clamped securely by the clamp 1, in which case the clamping action is maintained by the tension in the cord 25 and by the friction between cord 25 and clamping surface 10, the friction between cord 25 and clamping body 3 and the friction between cord 25 and thickening 12.

Figure 6:
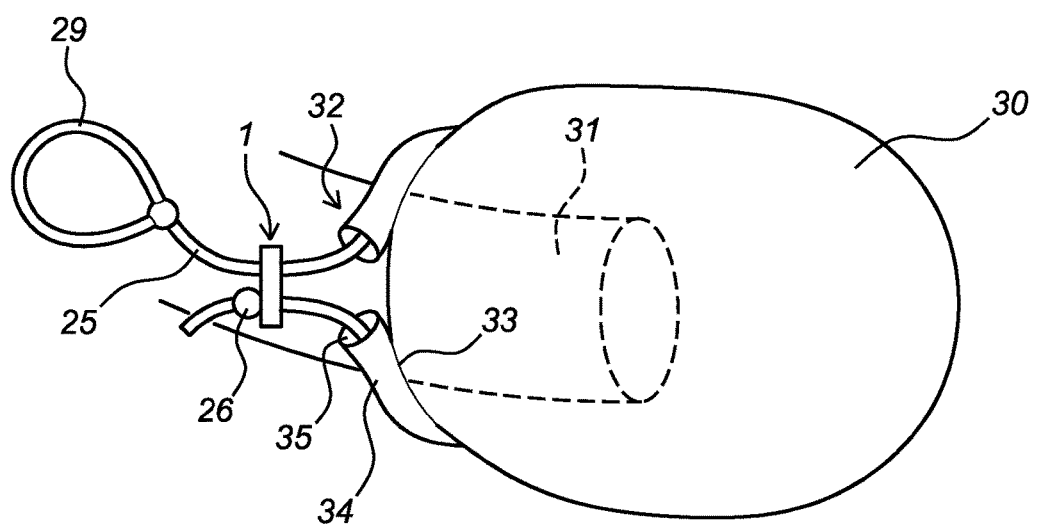
FIG. 6 shows a diagrammatic view of the clamping element, the cord and an envelope, in which the envelope is placed around a rectum.

With the situation illustrated in FIG. 5, the cord 25 is simply clamped around a single element 28 to be closed off, but it is also possible to securely clamp the cord 25 around more than one element. One particular application is fitting an envelope 30 around the cut end of a rectum 31 of a carcass in order to prevent the carcass from being soiled by manure emanating from the rectum 31. In this case, use is made of a plastic envelope 30 with an opening 32, whose edge 33 extending around the opening 32 is provided with guide means in the form of a folded strip 34 which adjoins the edge 33 and which encloses a duct 35 for guiding the cord 25. Such a situation is illustrated in FIG. 6. The envelope 30 is gripped with one hand from the inside and fitted around the end of the rectum 31, the envelope being turned inside out in the process. Subsequently, the pulling loop 29 is pulled tight with the other hand, as a result of which the cord 25 is pulled tight and the clamp 1 fixes the cord 25 and thus the envelope around the rectum 31.

The invention claimed is:

1. A clamp for clamping a cord at a clamping location of the cord on account of a tension prevailing at a tension side of the clamping location in the cord, in which the clamp comprises:
   an elongate frame which is provided with an elongate recess; and
   an elongate clamping body which is rotatably connected by a first end to a first end of the frame and extends at least partly in the recess of the frame,
   in which a cord duct is formed in the recess between the second end of the clamping body and an opposite clamping surface of the frame,
   in which the second end of the clamping body is configured to be carried along by a cord passed through the cord duct in the direction towards the tension side of the cord;
   in which the smallest distance between the clamping body and the clamping surface decreases when the clamping body is moved towards the tension side of the cord,
   wherein the frame is substantially in the shape of a U, in which the legs of the U are situated at its first end and the bridge at its second end,
   that the clamping body is provided with a widened part at its first end, and
   that a hinge is provided between each of the ends of the legs of the frame and the widened part of the clamping body, the axis of rotation of which extends at right angles to the longitudinal direction of the frame and at right angles to the axis of the cord duct.

2. The clamp as claimed in claim 1, wherein both hinges are formed by a thinning of material between both legs of the end of the frame and the widened part of the clamping body.

3. The clamp as claimed in claim 2, wherein the clamping body is provided with an opening which extends substantially parallel to the cord duct.

4. The clamp as claimed in claim 3, wherein the clamping surface of the frame is provided with a thickening which extends at right angles to the direction of the duct.

5. The clamp as claimed in claim 4, wherein the second end of the clamping body touches the thickening in a limit position of the clamping body.

6. The clamp as claimed in claim 4, wherein the frame is provided with cord guides which are arranged in or under the recess and guide the cord towards the center of the cord duct.

7. The clamp as claimed in claim 6, wherein the cord guides adjoin the thickening.

8. The clamp as claimed in claim 2, wherein the frame is provided with at least one stop extending in the recess from one of the legs in order to limit the movement by the clamping body towards the tension side of the cord.

9. The clamp as claimed in claim 8, wherein the frame is provided with two stops, each of which projects from one leg.

10. The clamp as claimed in claim 8, wherein recesses are arranged in the clamping body in a position of the clamping body which deviates from the clamping position and situated in the projection of the stops.

11. The clamp as claimed in claim 2, wherein an external thickening is provided on the bridge of the U-shaped frame.

12. The clamp as claimed in claim 11, wherein two pieces are placed between the external thickening and an upper edge of the bridge of the U-shaped part.

13. The clamp as claimed in claim 2, wherein the clamp is made of POM (polyoxymethylene).

14. A combination of a clamp as claimed in claim 2 and a cord, wherein the clamp is configured to clamp the cord.

15. The combination as claimed in claim 14, wherein the minimum thickness of the cord is greater than the smallest dimension in the cord duct between the clamping body and the frame.

16. The combination of a clamp as claimed in claim 3 and a cord, wherein the cord is passed through the cord duct and in that the free end of the cord is passed through the opening on the tension side and provided with a thickening, such as a knot, the largest size of which is greater than the smallest cross section of the opening.

17. The combination as claimed in claim 16, wherein the combination is provided with an enveloping element having an opening, which enveloping element is provided with guide means which extend around the opening and through which the cord extends.

18. A method for fitting a combination as claimed in claim 17 to the cut end of the rectum of the carcass of a slaughter animal, such as a cow, comprising the following steps:

placing a first hand in the enveloping element;

fitting the enveloping element around the part of the rectum adjacent to the cut end with the first hand, with the enveloping element being turned inside out in the process;

grasping the second end of the cord with the second hand;

pulling the cord tight with the second hand;

the first hand releasing the rectum; and the second hand releasing the second end of the cord.

19. The combination as claimed in claim 17, wherein the second end of the cord is provided with a pulling eye, pulling hook or pulling loop.

20. The method as claimed in claim 18, wherein the clamp is pressed down with at least one finger of the first hand, during or after the cord has been pulled tight by the second hand.

* * * * *